United States Patent [19]

Gardner

[11] 4,409,269

[45] Oct. 11, 1983

[54] FRAMED WOOD BLOCK FACING

[76] Inventor: Harlis Gardner, Rte. 2, Box 401, Raymond, Wash. 98577

[21] Appl. No.: 357,384

[22] Filed: Mar. 12, 1982

[51] Int. Cl.³ .......................... B32B 3/14; B32B 3/02
[52] U.S. Cl. ...................................... 428/50; 52/384; 52/391; 428/44; 428/53; 428/55; 428/58; 428/191
[58] Field of Search .................. 428/46, 44, 47, 50, 428/191, 58, 56, 55, 413, 142, 67, 167, 535; 144/344; 52/457, 390, 391, 384, 306, 456; 156/63, 297

[56] References Cited

U.S. PATENT DOCUMENTS

| | | | |
|---|---|---|---|
| 1,890,954 | 12/1932 | Snyder | 52/390 |
| 3,783,082 | 1/1974 | Almog | 428/56 |
| 4,060,437 | 11/1977 | Strout | 428/50 |
| 4,181,763 | 1/1980 | Shellenberger | 428/142 |

*Primary Examiner*—Paul J. Thibodeau
*Attorney, Agent, or Firm*—Ward Brown; Robert W. Beach

[57] ABSTRACT

Wood blocks cut from lumber mill endpieces are adhesively secured to a backing sheet with strips of contrasting material interposed between the blocks. An epoxy resin coating is applied over the blocks and strips to form a protective and reinforcing translucent cover layer.

2 Claims, 3 Drawing Figures

U.S. Patent  Oct. 11, 1983  4,409,269
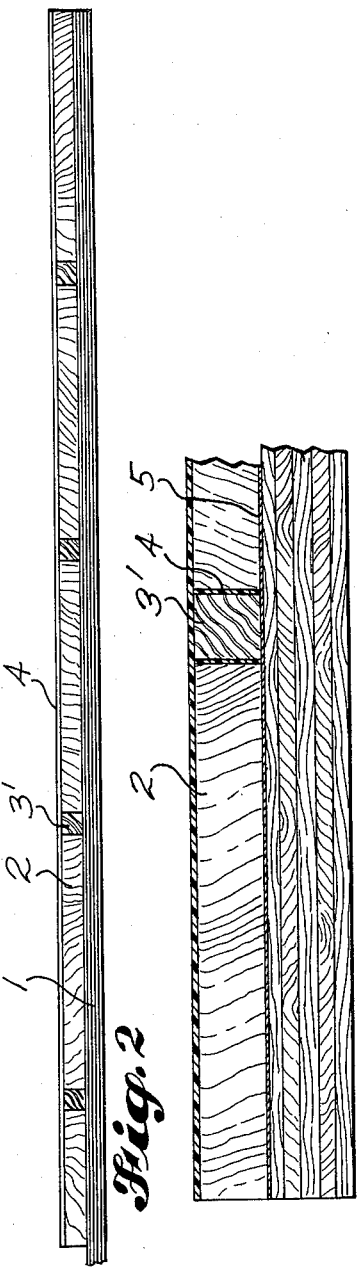
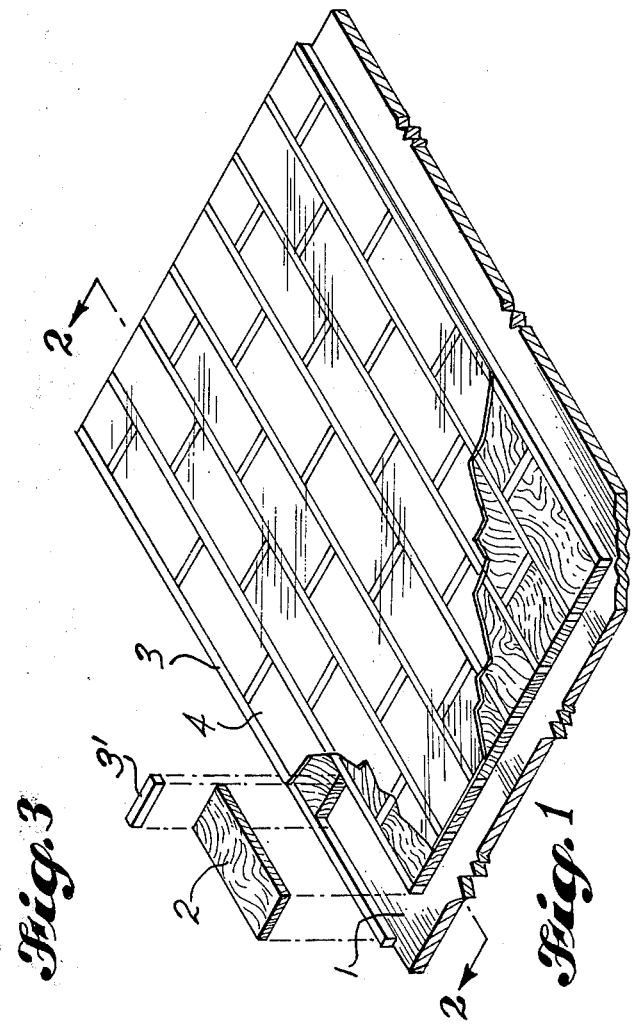

FRAMED WOOD BLOCK FACING

BACKGROUND OF THE INVENTION

1. Field of the Invention

The present invention relates to decorative wood facings and, in particular, a decorative facing which includes a backing sheet and a face layer of wooden blocks framed by strips of contrasting material.

2. Prior Art

Since the purpose of a decorative facing is to beautify the wall of a structure by covering the wall with attractive material, prior facings have been made from unblemished materials and, therefore, are expensive. In marked contrast, the facings of the present invention, though attractive, are constructed from inexpensive scrap material which would otherwise be discarded.

Furthermore, to reduce expense prior facings have been made as thin as practical for the purpose for which they were to be used, whereas the thickness and strength of the present invention enables it to be used as a freestanding structure or as a horizontal surface such as a shelf or a tabletop as well as a facing for a wall.

SUMMARY OF THE INVENTION

The principal object of the present invention is to provide an attractive and durable, yet inexpensive, decorative facing adapted to several different uses, such as a facing for a wall or tabletop, or as a shelf or freestanding partition.

It also is an object to provide a simple method for manufacturing such a decorative facing.

The foregoing objects can be accomplished by providing a backing sheet, an array of spaced blocks secured to a surface of the sheet and strip members fitted between the blocks.

In the preferred embodiment of the invention, a protective layer of translucent material covers and is adhered to the array. The blocks are of uniform thickness, cover at least the major portion of a surface of the backing sheet and are cut from lumber endpieces and scraps. The strip members are wood strips of the same thickness as the blocks, and the blocks and strip members are secured to the backing sheet by a thin intermediate layer of adhesive.

In manufacturing the decorative facing, adhesive is applied to a surface of the backing sheet and the blocks and strip members are alternately laid on the sheet. Liquid epoxy resin is poured over the array of blocks and strips, filling any cracks between them, and is allowed to set into a thin protective and reinforcing covering layer.

BRIEF DESCRIPTION OF THE DRAWINGS

FIG. 1 is a fragmentary top perspective of a facing in accordance with the present invention, some parts being broken away and other parts being shown in exploded relationship.

FIG. 2 is an enlarged, fragmentary, vertical section taken along line 2—2 of FIG. 1.

FIG. 3 is a further enlarged, fragmentary, vertical section of the facing of FIG. 1.

DETAILED DESCRIPTION

As shown in FIGS. 1 and 2, the preferred embodiment of a decorative facing in accordance with the present invention includes a sturdy backing sheet 1, an array of uniformly spaced rectangular blocks 2 of uniform thickness covering at least the major portion of a surface of the sheet, thin strip members 3 and 3' of the same thickness as the blocks, fitted between the blocks and extending along opposite sides of the array, and a thin protective and, preferably, reinforcing layer of translucent material 4 covering the entire array. As seen in FIG. 3, the blocks 2 and strips 3 can be secured to the backing sheet by a thin intermediate layer of adhesive 5 and any cracks or spaces between the blocks and the strip members can be filled with the translucent material 4.

The backing sheet can be plywood of a thickness of ½ inch (1.27 cm) or ¾ inch (1.9 cm), for example. Preferably the blocks and strip members are wood. Virtually any type of wood may be used. The blocks can be conveniently and inexpensively cut from endpieces and scraps from a lumber mill, of the type which are normally discarded. Myrtle wood or cedar blocks oiled with tung oil are particularly attractive, readily available and relatively inexpensive.

While it is preferred that the blocks have exposed surfaces of rectangular shape, other shapes may be used to provide a different effect. Furthermore, the junctions between the top and upright faces of the blocks may be rounded or bullnosed in outline. Nevertheless, when arranged in the array, it is preferred that each interior edge of a block be parallel to an interior edge of an adjacent block so that each interior edge of each of the blocks may be abutted against strip members of uniform thickness. The top surfaces of the strip members preferably are flush with the top surfaces of the blocks, but may be recessed or project beyond the top surfaces of the blocks for a different framing effect.

To reduce the amount of material used and therefore the weight of the facing, the thickness of the blocks and strip members should be substantially less than the width or length of a block. Preferably, the blocks and strip members have a thickness between about ¼ inch (0.63 cm) and ¾ inch (1.9 cm).

Preferably the strip members contrast with the individual blocks. Where the blocks are dark, such as myrtle wood or oiled cedar, the strip members can be lighter colored wood material such as unfinished fir. Framing each block with strip members of uniform width heightens the pleasing unique appearance of each individual wood block. In addition, where the blocks are arranged in straight rows, long strip members extending throughout the length of a plurality of blocks may be used between rows which strengthens the facing.

To form a facing having an interesting and varied appearance, blocks having face grain and blocks having end grain may be randomly applied to the backing. Also since the blocks need not add to the strength of the facing, blocks with belmishes, such as knots and insect damage, may be used. Alternatively, numerous small unblemished blocks may be cut from otherwise unusable blemished lumber discards and used to form a facing of unblemished blocks.

To construct the preferred facing, the thin layer of adhesive 5 is applied to a surface of the backing sheet 1 and a long strip member 3 is laid along one longitudinal edge of the sheet. Longitudinal edges of the rectangular blocks 2 and end edges of the short, transversely extending strip members 3' are butted against the previously laid long strip member to form a row of alternating, tightly butted blocks and strip members. Additional rows are applied in the same manner until the array is completed. To increase the ease of assembly, a short strip member may be glued to one end of each block prior to securing the block and strip to the backing.

Upon assembling the array of blocks and strips on the backing sheet, liquid epoxy resin may be poured over the horizontal array and allowed to set. As best seen in FIG. 3, the resin coating fills the cracks between adjacent blocks and strip members and forms an impermeable smooth glaze which protects the facing. When hardened, the rigid resin coating reinforces the array.

The completed decorative facing may be secured to an existing wall structure or may itself be used as a wall or a freestanding partition. If both faces are to be exposed, blocks and the translucent coating may be applied to both sides of the backing sheet. Further, the facing may be used in horizontal position as, for example, a shelf, countertop or tabletop, or as a facing for one of these types of horizontal surfaces.

I claim:

1. A decorative facing comprising: a backing; several individual rectangular wood blocks of substantially uniform thickness and width and secured to said backing in several substantially straight, parallel, uniformly spaced rows with their lengths extending lengthwise of said rows, each of said rows having a plurality of said blocks with the adjacent ends of adjacent blocks spaced apart uniformly lengthwise of such row so that the distance between the adjacent ends of adjacent blocks is substantially equal to the distance between adjacent blocks in adjacent rows transversely of such rows; first elongated wood strips interposed between adjacent rows of blocks, having faces adjacent to and secured to the backing, of a width substantially equal to the distance between adjacent rows of blocks and of a length at least as great as the combined lengths of a plurality of the blocks in at least one of such adjacent rows so as to extend unbrokenly in a direction lengthwise of and alongside a plurality of the blocks in such one adjacent row; and second elongated wood strips interposed between the adjacent ends of adjacent blocks in one of the rows, having faces adjacent to and secured to the backing, of a width substantially equal to the distance between such adjacent block ends and extending transversely of such row between adjacent first strips bordering such row; said first and second strips framing said blocks and maintaining alignment of said blocks, and the faces of said strips and said blocks remote from said backing being exposed to view.

2. The facing defined in claim 1, and a translucent layer of epoxy resin covering and bonded to the blocks and the first and second strips for providing a rigid, protective and reinforcing coating through which the blocks and the strips can be viewed.

* * * * *

UNITED STATES PATENT AND TRADEMARK OFFICE
CERTIFICATE OF CORRECTION

PATENT NO.  : 4,409,629
DATED       : October 11, 1983
INVENTOR(S) : Norman M. Puls Page 1 of 2

It is certified that error appears in the above-identified patent and that said Letters Patent are hereby corrected as shown below:

Column 1, after the title and before "Background of the Invention" insert

--<u>Field of the Invention</u>

This invention relates generally to magnetic disc drive systems employing floppy discs and particularly to an apparatus for precisely and reliably centering and clamping the floppy disc.--

Column 2, line 21, after "system" and before "both", "buffers" should read --suffers--; line 39, after "petals" and before "to", "being" should read --begin--. Column 3, line 4, "<u>Detailed</u>" should read --<u>Brief</u>--; line 42, after "boss" and before "within", "9" should read --19--. Column 4, line 14, after "a" and before "cone", "divering" should read --diverging--; line 35, after "as" and before "seen", "but" should read --best--. Column 5, line 32, after "hereafter" insert a period --.--. Column 6, line 40, after "both" and before "the", "byt" should read --by--; line 44, after "42" and before "to", "being" should read --begin--; line 53, after "dual-sided" and before "drives", "8'" should read --8"--.

UNITED STATES PATENT AND TRADEMARK OFFICE
CERTIFICATE OF CORRECTION

PATENT NO. : 4,409,629
DATED : October 11, 1983
INVENTOR(S) : Norman M. Puls

It is certified that error appears in the above-identified patent and that said Letters Patent are hereby corrected as shown below:

```
Column 8, line 41, after "which" and before "a" strike "is";
line 49, after "interior" and before "of" insert --aperture--.
Column 9, line 23, after "extending" and before "portion",
"flanger" should read --flange--.
```

Signed and Sealed this

Twenty-ninth Day of May 1984

[SEAL]

Attest:

GERALD J. MOSSINGHOFF

Attesting Officer

Commissioner of Patents and Trademarks